Jan. 6, 1953  V. C. KAHLE  2,624,146
FISHHOOK
Filed Aug. 3, 1949
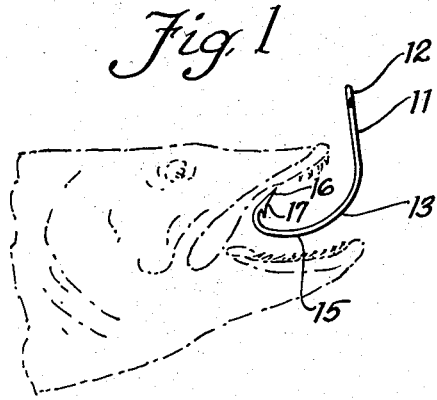
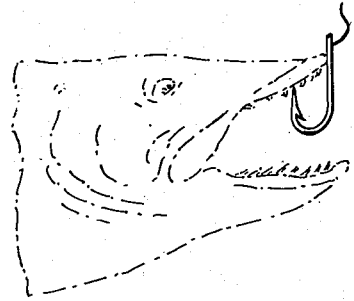
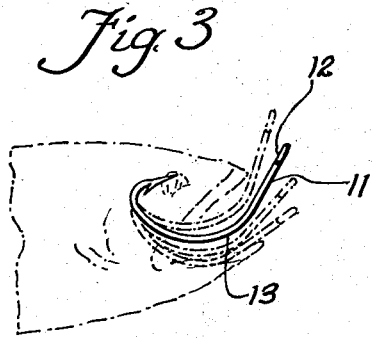
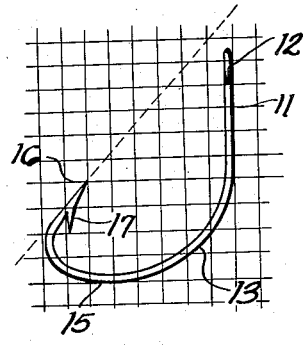
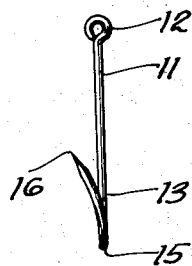
INVENTOR.
Victor C. Kahle
BY
Thiess, Olson & Mecklenburger
attys Patented Jan. 6, 1953

2,624,146

UNITED STATES PATENT OFFICE 2,624,146

FISHHOOK

Victor C. Kahle, South St. Paul, Minn.

Application August 3, 1949, Serial No. 108,372

4 Claims. (Cl. 43—43.16)

This invention relates to a fish hook and has special reference to a fish hook in which the sharp point is so positioned with respect to the rest thereof that a fish may strike it from almost any direction with little or no interference from the shank of the hook, and the point will freely and naturally enter relatively far into the fish's mouth where it can be securely set.

More particularly the present invention relates to a new type of fish hook having an upper shank portion and a lower shank portion extending laterally therefrom and with the bend of the hook at the end of the lower shank portion terminating in a sharp point. The bend, point and lower shank portion form a substantially U-shaped hook end, with the sides thereof preferably diverging somewhat.

With the hook of the present invention provided with angularly disposed upper and lower shank portions, the point thereof is relatively far from the upper shank portion, this distance being substantially greater than the distance from the point to the adjacent lower shank portion. As the point is spaced at a relatively great distance from the upper shank portion, a fish may strike the point from the front, from below, and from each side of the hook, and in each instance the point may enter far into the fish's mouth without interference from the upper shank portion.

In addition to this, both the point of the hook and the lower shank portion may enter the fish's mouth, and there is little likelihood of a fish "freezing" the hook so that when pull is exerted on the fish line the hook will be pulled out of the fish's mouth. Instead, with the present hook the pull on the line will cause the hook to pivot about the point and penetrate the upper jaw of the fish.

Due to the shape of the present hook, including the two shank portions and a bend of small radius between the lower shank portion and the point, live bait, when placed on the hook, will be spaced far from the upper shank portion and will appear quite natural, and, therefore, inviting to the fish. The sharp bend also serves to prevent the bait from working away from the point and up the shank of the hook.

An object of the present invention is to provide a fish hook having an upper shank portion and a lower shank portion extending laterally therefrom.

Another object is to provide such a fish hook in which the bend between the lower shank portion and the point of the hook has a relatively small radius.

A further object is to produce a fish hook of the type above referred to in which the sharp point is spaced relatively far from the upper shank portion, permitting a fish to strike the hook from almost any direction with substantially no interference from the upper shank portion.

A still further object is to provide a fish hook having an upper shank portion and a lower shank portion extending laterally therefrom, and a bend portion extending laterally thereon at the outer end of having a sharp point thereon which forms with the lower shank portion a substantially U-shaped hook end with the sides diverging slightly.

Further objects and advantages will be apparent from the following description and claims when considered with the accompanying drawing, in which:

Fig. 1 is a side elevational view of a fish hook embodying the present invention, shown being struck by a fish illustrated in dotted lines;

Fig. 2 is a side elevational view showing the usual type of prior art hook being struck by a fish;

Fig. 3 is a side elevational view of a hook such as shown in Fig. 1 illustrating the pivoting of the hook about its point when struck by a fish and after pull has been exerted on the fish line by the fisherman;

Fig. 4 is an enlarged, side elevational view of the hook shown in Figs. 1 and 3; and Fig. 5 is a front elevational view of the hook shown in Fig. 4.

Referring more particularly to the drawings, there is shown a hook embodying the present invention comprising a substantially straight, upper shank portion 11, preferably having an eye 12 at its upper end, to which the fish line is to be connected. Extending laterally at an angle of more than 90° from the lower end of the upper shank portion there is a lower shank portion 13 which is slightly curved and terminates in a bend 15 having thereon a sharp point 16 with a barb 17. While the upper and lower shank portions may be of different relative lengths, they are preferably about equal in length, although if desired one of the shank portions may be slightly longer than the other.

By having the lower shank portion extend laterally from the upper shank portion with the bend and point at the outer end of the lower shank portion, the point of the hook is spaced a relatively great distance from the upper shank portion. Accordingly, a fish may strike the point from the front, either side, or below, and the hook will extend a substantial distance into the fish's moth. To be effective, both the point of the hook and the adjacent shank portion should enter into the fish's mouth. With the present construction this readily occurs even when the fish is substantially horizontal at the time it strikes the hook.

With the common prior art hook, such as shown in Fig. 2, the point cannot enter very far into a fish's mouth, making it relatively difficult to set the hook and frequently resulting in the hook being so close to the front of the jaw that it pulls out fairly easily. On the other hand, with a hook embodying the present invention the point may enter the fish's mouth a substantial distance, so that it may be securely set in the fish's jaw.

Another advantage of the present hook is that when struck by a fish, pressure exerted by the fish's jaws on the point automatically tips the hook upward, and then the hook is tilted down again when pull is exerted on the hook through the fish line. This is illustrated in Fig. 3 and as there shown causes the hook to sink deep into the flesh or through the upper jaw. This action also prevents the fish from freezing the hook between the jaws, as may occur when a fish strikes a prior art hook of the type shown in Fig. 2, from below, so that the mouth of the fish passes over both the point and the shank portion.

Because of the laterally extending lower shank portion, live bait when used on the hook stands out clearly and away from the upper half of the shank and the fish line, and is therefore far more alluring and attractive to the fish. Moreover, because of the relatively sharp bend, bait secured over the point will be held thereon and prevented from riding up the shank portion.

The hook embodying the present invention, therefore, attracts more fish when properly baited, and more securely and effectively hooks the fish striking the hook.

While I have shown and described a particular embodiment of the present invention, changes may be made therein without departing from the present invention, and therefore I wish to be limited only by the prior art and the appended claims.

I claim:

1. A fish hook having an upper vertical substantially straight shank portion terminating in an eye at its free end, a gradually curved lower shank portion extending downwardly and transversely from said upper shank portion, and a relatively sharp upwardly extending curved portion at the outer end of said lower shank portion terminating in a barbed point, said upper and lower shank portions extending the total vertical length of the hook, said lower shank portion having a vertical component of less than one-half the total vertical length of said hook, said point lying in a substantially horizontal plane passing adjacent the lower end of said upper shank portion and being spaced from the lower end of said upper shank portion a distance greater than one-half the vertical length of said hook, the longitudinal center line of said barbed point lying in a plane passing adjacent the free end of said eye, said latter plane forming an acute angle with a tangent to the lower edge of the gradually curved portion of said hook normal to the longitudinal axis of said substantially straight upper shank portion.

2. A fish hook having an upper vertical substantially straight shank portion terminating in an eye at its free end, a gradually curved lower shank portion extending downwardly and transversely from said upper shank portion, and a relatively sharp upwardly extending curved portion at the outer end of said lower shank portion terminating in a barbed point, said upper and lower shank portions extending the total vertical length of the hook, said lower shank portion having a vertical component of less than one-half the total vertical length of said hook, said point lying in a substantially horizontal plane passing adjacent the lower end of said upper shank portion, and said point being spaced from said lower end of said upper shank portion a distance greater than one-half the vertical length of said hook, the longitudinal center line of said barbed point lying in a plane passing adjacent the free end of said eye, said latter plane forming an acute angle of not substantially more than 45° with a tangent to the lower edge of the gradually curved portion of said hook normal to the longitudinal axis of said substantially straight upper shank portion.

3. A fish hook having an upper vertical substantially straight shank portion terminating in an eye at its free end, a gradually curved lower shank portion extending downwardly and transversely from said upper shank portion, and a relatively sharp upwardly extending curved portion at the outer end of said lower shank portion terminating in a barbed point, said upper and lower shank portions extending the total vertical length of the hook, said lower shank portion having a vertical component of less than one-half the total vertical length of said hook, said point lying in a substantially horizontal plane passing adjacent the lower end of said upper shank portion, the longitudinal center line of said barbed point lying in a plane passing adjacent the free end of said eye, said latter plane forming an acute angle with a tangent to the lower edge of the gradually curved portion of said hook normal to the longitudinal axis of said substantially straight upper shank portion, the vertical distance from said barbed point to said tangent being not substantially more than two-thirds the distance from said point to the lower end of said upper shank portion.

4. A fish hook having an upper vertical substantially straight shank portion terminating in an eye at its free end, a gradually curved lower shank portion extending downwardly and transversely from said upper shank portion, and a relatively sharp upwardly extending curved portion at the outer end of said lower shank portion terminating in a barbed point, said upper and lower shank portions extending the total vertical length of the hook, said lower shank portion having a vertical component of approximately four-ninths of the total vertical length of said hook, said point lying in a substantially horizontal plane passing adjacent the lower end of said upper shank portion and being spaced from the lower end of said upper shank portion a distance approximately five-ninths that of the total length of said hook, the longitudinal center line of said barbed point lying in a plane passing adjacent the free end of said eye, said latter plane forming an acute angle with a tangent to the lower edge of the gradually curved portion of said hook normal to the longitudinal axis of said substantially straight upper shank portion.

VICTOR C. KAHLE.

REFERENCES CITED

The following references are of record in the file of this patent:

UNITED STATES PATENTS

| Number | Name | Date |
|---|---|---|
| 842,594 | VanVleck et al. | Jan. 29, 1907 |
| 2,531,981 | Liebe | Nov. 28, 1950 |

FOREIGN PATENTS

| Number | Country | Date |
|---|---|---|
| 793 | Great Britain | Jan. 5, 1884 |
| 10,056 | Great Britain | of 1904 |
| 31,147 | Netherlands | Oct. 16, 1933 |